United States Patent [19]

Gupta

[11] Patent Number: 4,748,341
[45] Date of Patent: May 31, 1988

[54] UNINTERRUPTIBLE POWER SUPPLY

[75] Inventor: Suresh Gupta, Los Alamitos, Calif.

[73] Assignee: RTE Deltec Corporation, San Diego, Calif.

[21] Appl. No.: 29,575

[22] Filed: Mar. 24, 1987

[51] Int. Cl.[4] ............................................. H02J 7/00
[52] U.S. Cl. ........................................ 307/64; 307/66; 307/87; 361/8; 323/258; 323/343
[58] Field of Search ................. 307/64, 66, 43, 45, 307/46, 62, 63, 82, 83, 85, 87; 323/255, 256, 258, 343, 340, 260, 266, 272, 274

[56] References Cited

U.S. PATENT DOCUMENTS

| | | | |
|---|---|---|---|
| 3,970,918 | 7/1976 | Cooper | 323/258 |
| 4,201,938 | 5/1980 | Neumann | 323/343 |
| 4,241,261 | 12/1980 | Ebert | 307/64 X |
| 4,301,489 | 11/1981 | Stich | 361/8 X |
| 4,330,818 | 5/1982 | Peschel | 363/126 |
| 4,363,060 | 12/1982 | Stich | 361/8 |
| 4,475,047 | 10/1984 | Ebert | 307/66 |
| 4,533,892 | 8/1985 | Masuhara et al. | 323/340 X |
| 4,622,513 | 11/1986 | Stich | 323/343 |
| 4,623,834 | 11/1986 | Klingbid et al. | 323/258 |
| 4,628,251 | 12/1986 | Holder | 323/340 |

Primary Examiner—William M. Shoop, Jr.
Assistant Examiner—Paul Ip
Attorney, Agent, or Firm—James Earl Lowe, Jr.

[57] ABSTRACT

An uninterruptible power supply comprising a regulating transformer including output circuitry for connection to a load, first input circuitry for coupling a reserve AC voltage source to the regulating transformer and second input circuitry for coupling a primary AC voltage source to the regulating transformer, the second input circuitry comprising a plurality of winding taps, with each of the taps including a tap switch coupled to the primary AC voltage source.

The uninterruptible power supply also includes a voltage control monitor for monitoring the voltage of the primary source and, if the voltage is outside a predetermined maximum allowable range, opening all of said tap switches to isolate the primary source from said transformer, and, if said voltage is within said predetermined maximum allowable range, selectively closing one of said tap switches so that the voltage at the load is held within a predetermined range.

7 Claims, 5 Drawing Sheets

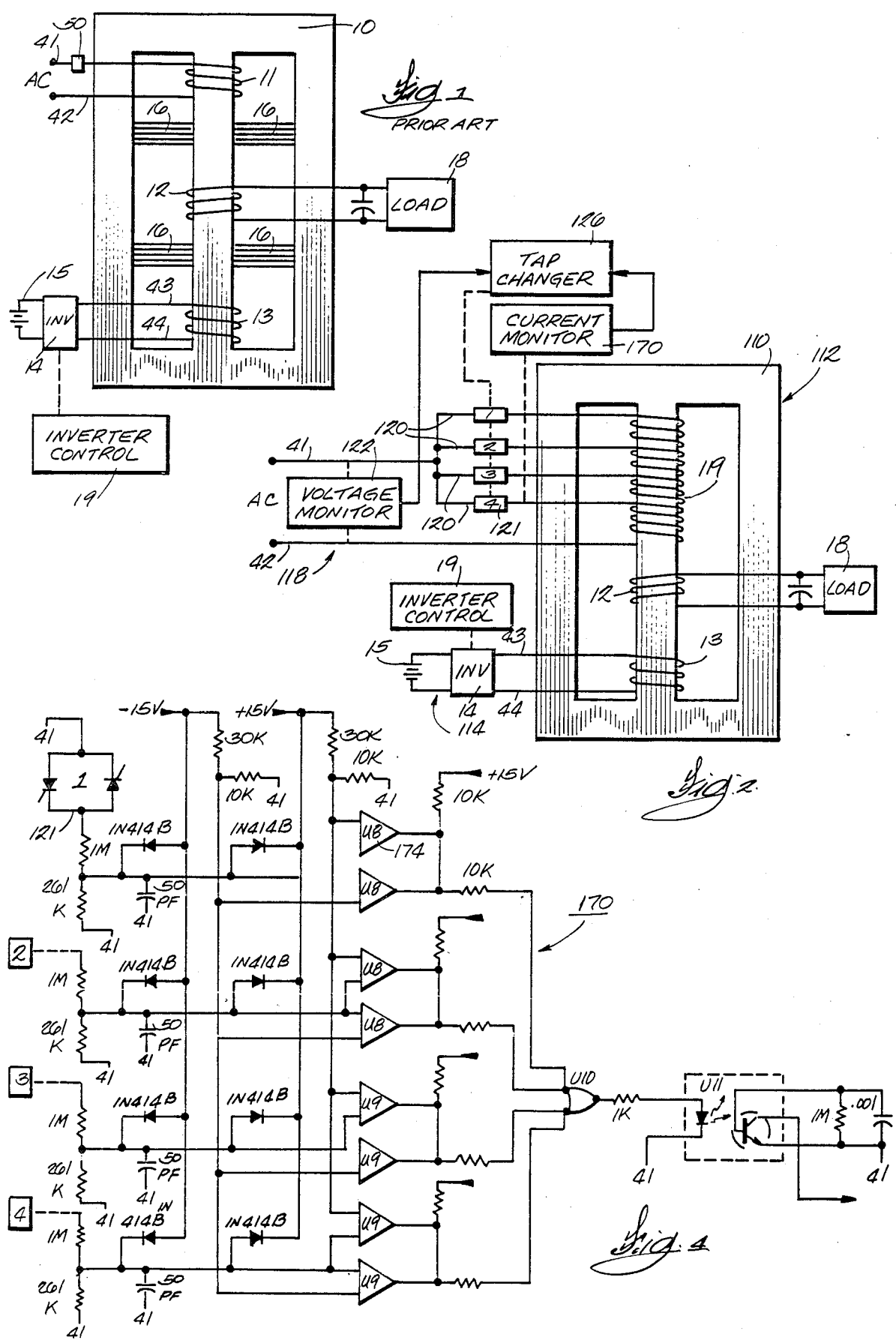

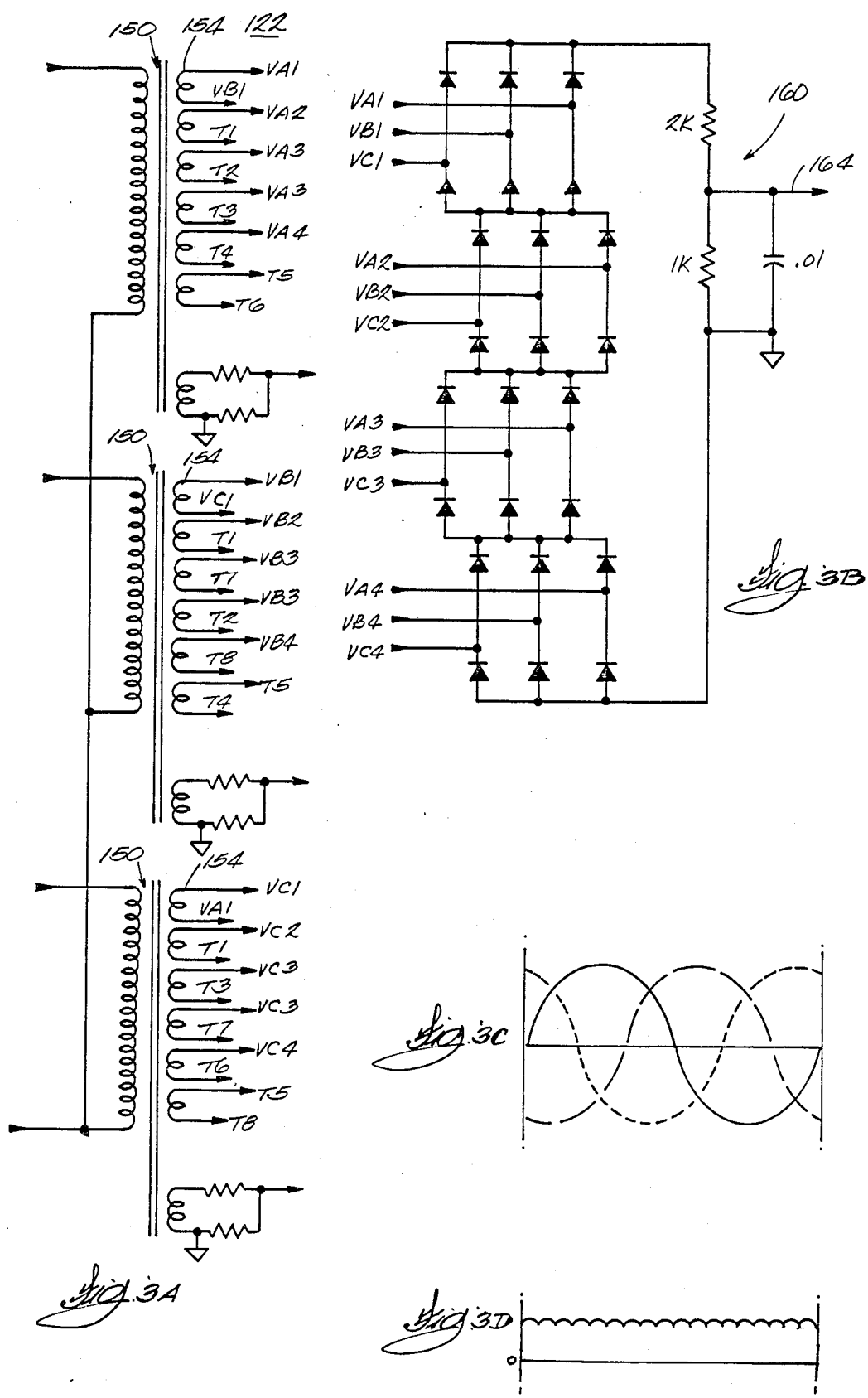

UNINTERRUPTIBLE POWER SUPPLY

BACKGROUND OF THE INVENTION

This invention relates to uninterruptible power supplies which have a plurality of input power sources and which are operative to supply continuous power output irrespective of the condition of individual ones of the input power sources. More particularly, this invention relates to the power topology of such uninterruptible power supplies and, more particularly, to means for preventing momentary reductions in output voltage associated with step changes in output current, and means for monitoring the input voltages.

AC commercial power or an engine generator is often used as a primary power source to power communication and data processing equipment as well as other similar electronic equipment which utilize stored program controls or solid state integrated circuit technology. These circuits are generally very sensitive to variations in the input power signal from its desired standard wave form. Primary AC power wave forms are subject to many variations from the standard wave form due to the demands of other users on the power line, changes in demand of the power user, particularly large power users, and other factors. To avoid transient and momentary power outages or changes which may cause undetected damage to this equipment, or otherwise cause costly shutdowns due to damaged circuitry, disrupted communications or errors in computations, on-line uninterruptible power supplies are utilized to isolate variations in the AC power signal from the equipment being powered and to supply continuous power to an output load regardless of the actual performance of the basic input primary AC power signal or changes in the customer's load.

Some prior uninterruptible power supplies designed to serve this purpose have coupled two power sources through a single, high reactance ferroresonant transformer structure to supply uninterruptible power to the load to be energized. The primary power is typically that supplied by a commercial utility or generator. A secondary or reserve power supply supplies make up power to the load upon degradation of the primary power source. In the event of failure of the primary power source, the reserve power supply will supply all of the load. The high reactance transformer includes magnetic shunts for isolating the primary and the secondary sources. The transformer's high reactance also assists in providing the voltage differential necessary to regulate the output voltage of the transformer by supplying make up power from the reserve power supply when large voltage swings occur in the primary AC voltage.

The use of high reactance transformers however has inherent problems; a principal one of which is when there is a step change in the load connected to the load side of the uninterruptible power supply, the high reactance transformer causes a momentary reduction in the load voltage. This momentary reduction is defined by the voltage reduction which occurs when the load current goes from zero to full load. In the case of high reactance transformers, this momentary dip is on the order of 40%. This 40% dip in load voltage can cause significant problems. Circuitry designed to bypass the transformer has been used to help alieviate this problem, but by-passing the transformer risks load voltage disruptions when the primary AC voltage is at an abnormal voltage. The use of high reactance transformers also reduces the uninterruptible power supply's efficiency and increases its size and the amount of heat losses.

SUMMARY OF THE INVENTION

It is therefore one of the principal features of this invention to provide an uninterruptible power supply which finely regulates its output voltage even in the event of relatively large AC input voltage swings, while at the same time eliminating the need for a high reactance transformer. More particularly, it is one of the principal features of this invention to provide such an uninterruptible power supply which only has a momentary output voltage dip on the order of about 10% associated with going from zero load current to full load current.

Another of the principal features of the invention is to provide an uninterruptible power supply with an improved means for monitoring the input voltage.

Another of the principal features of the invention is to provide an uninterruptible power supply which can handle higher surge currents for a given KVA rating than prior uninterruptible power supplies and which can continue to coarsely regulate AC input power even if the reserve power source fails.

This invention provides an uninterruptible power supply including a transformer without high reactance. More particularly, the transformer has a primary power input, a secondary or reserve power input, and an output. The primary input includes a plurality of winding taps, each of which has a tap change switch connected to the primary power input. By so connecting the primary input to the transformer through a selected one of the tap change switches, the uninterruptible power supply controls large swings in the primary voltage input to the transformer. The secondary or reserve power input is connected through an inverter to the transformer and operates in parallel with the primary power input to finely regulate the output voltage.

Means is also provided for monitoring the primary input voltage and current for selecting or turning on the appropriate tap switch to provide for coarse voltage control of the load. The inverter and reserve power supply provides the fine voltage regulation of the output voltage within the parameters of the coarse regulation provided by the tap changing switches and voltage monitoring circuitry. The voltage monitoring system also quickly senses input voltage changes so that in the event of a significant change in the AC input voltage, all of the tap switches can be opened quickly so utility current is interrupted without causing load or inverter disturbances.

This invention also provides an uninterruptible power supply including an input voltage monitoring circuit which comprises a three-phase primary input with a plurality of transformers on each of the three input phase circuits for dividing the input voltage into approximately 15 degrees per cycle which represents 0.69 milliseconds for a three phase 60 Hertz system. The provision of the numerous individual 15 degree intervals per cycle provides for improved transient response of the voltage monitoring circuit to changes in the input voltage.

Various other features and benefits of the invention are more particularly set forth in the attached drawings and description and the appended claims.

BRIEF DESCRIPTION OF THE DRAWINGS

FIG. 1 is a schematic of a prior art uninterruptible power supply showing input and output windings coupled to a high reactance transformer structure.

FIG. 2 is a schematic illustrating the input and output windings coupled to a transformer structure suitable for use as a power coupling medium in an uninterruptible power supply which embodies various of the features of the invention.

FIG. 3 is an illustration of the voltage monitoring and rectification circuitry utilized in the uninterruptible power supply shown in FIG. 2.

FIG. 4 is an illustration of the current sensor circuitry utilized in the uninterruptible power supply shown in FIG. 2.

DESCRIPTION OF THE PREFERRED ENBODIMENT

Figure 5A:
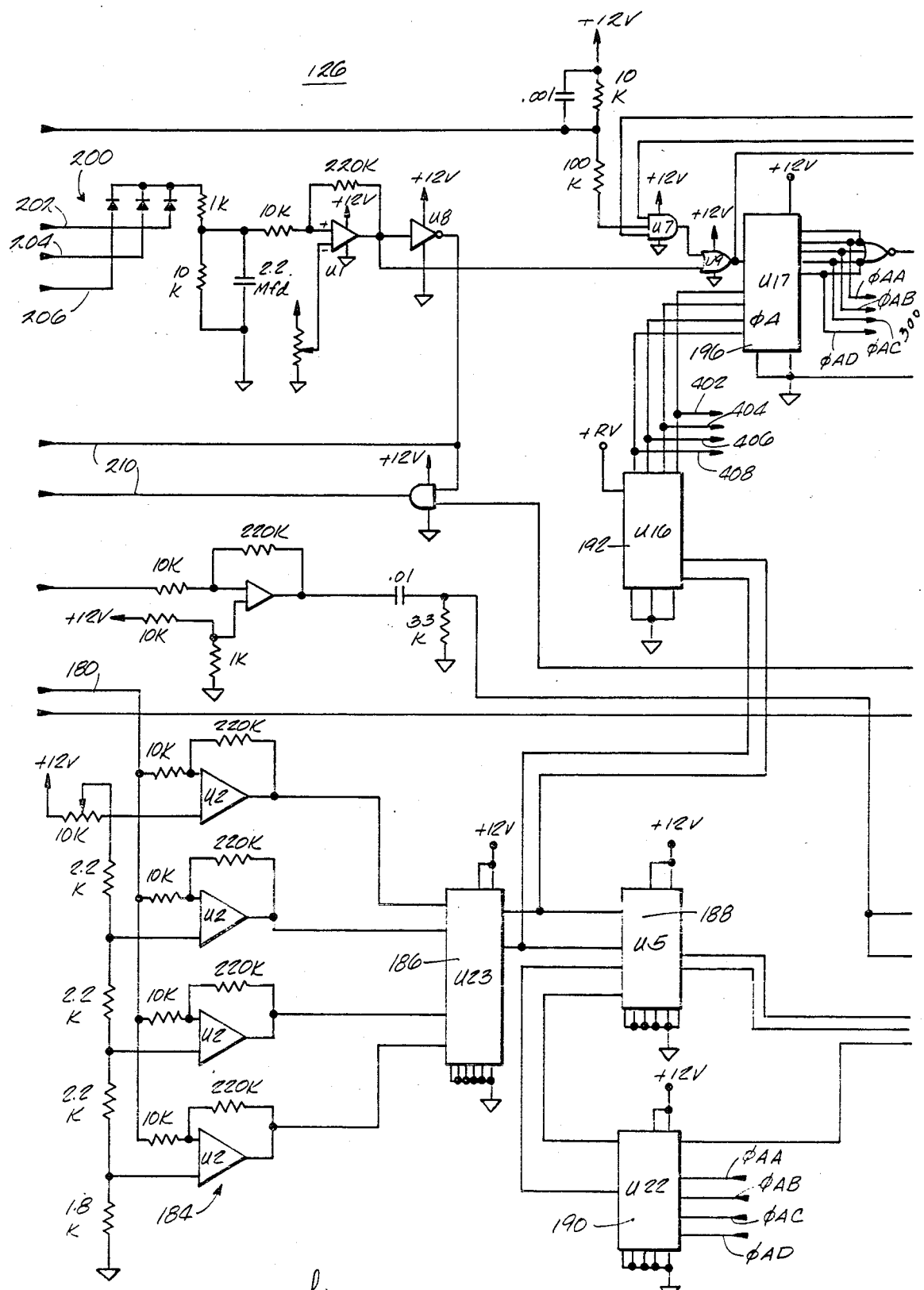
FIG. 5 is an illustration of the circuitry which takes the voltage readings and operates the tap switches of the uninterruptible power supply shown in FIG. 2.

The ferroresonant transformer arrangement utilized in some prior art uninterruptible power supplies is illustrated schematically in FIG. 1. This illustration and a more particular example of one such prior art uninterruptible power supply is found in Ebert, Jr. U.S. Pat. No. 4,475,047 issued Oct. 2, 1984, which is incorporated herein by reference. More particularly, FIG. 1 illustrates the transformer structure suitable for use in these prior art uninterruptible power supplies. The transformer structure 10 is shown as having two input windings 11 and 13 and a single output winding 12 connected to the load 18. The transformer structure is designed so that the input windings 11 and 13 are isolated from each other by magnetic shunts 16 while permitting power to be supplied from input windings 11 and 13 to the output winding 12 either singularly or in combination. The primary power source, which can be a commercial AC power signal supplied by a utility, is coupled to input winding 11 via input leads 41 and 42. The reserve power signal applied to leads 43 and 44 of input winding 13 is an AC signal derived from a DC voltage source 15 which is coupled to an inverter 14. Inverter circuit 14 inverts the DC voltage and applies a periodic reserve power signal to the input winding 13. Inverter control 19 monitors the uninterruptible power supply's voltages and currents and controls the operation of the inverter so that the voltage seen by the load 18 remains essentially constant.

In the normal mode of operation of this prior art power supply, the AC input signal is the sole source of power supplied to the load 18 through the transformer 10.

In some prior systems (not shown) there is a bypass mode of operation in which the AC input signal is connected directly to the load, via leads and a bypass switch, thereby bypassing the transformer. This bypass is used when the load demands a large current surge, such as in starting a motor. When the commercial AC voltage drops in amplitude, the reserve DC voltage source 15 and the inverter 14 supply a portion of the output power to the load 18 to augment the power supplied by the commercial AC source.

The reserve DC source and the inverter supply all of the power to the load when the primary AC signal has been deemed by the control system as unacceptable and has been disconnected by opening the line switch 50.

When power from the inverter is used to augment that supplied by the commercial AC source, the inverter acts through the ferroresonant transformer to provide a voltage differential which insures that the voltage on the load is kept in a stable condition. The high reactance provided by the magnetic shunts and the current which circulates through the transformer from the reserve power source provide the makeup voltage necessary to maintain the desired voltage at the load. The reactance of the ferroresonant transformer is necessary in these devices to provide the necessary makeup voltage.

A transformer structure 110 suitable for use with an uninterruptible power supply 112 of this invention is illustrated schematically in FIG. 2.

More particularly, the uninterruptible power supply 112 includes a regulating transformer 110 including output means comprising output winding 12 for connection to the load 18, and first input means 114 for coupling a reserve AC voltage via leads 43 and 44 to the regulating transformer 110. This first input means 114 is a conventional battery inverter reserve power supply designed to operate in parallel with a primary AC input. The reserve power input means described in connection with FIG. 1 and as shown in Ebert, Jr. U.S. Pat. No. 4,475,047 is suitable for use as this first input means 114. Another suitable reserve power supply suitable for this purpose is described in Shibuya U.S. Pat. No. 4,604,530 issued Aug. 5, 1986, which is incorporated herein by reference.

Like numerals are used for like components in FIGS. 1 and 2.

The uninterruptible power supply 112 and second input means 118 couples the primary AC voltage via leads 41 and 42 to the regulating transformer 110. The second input means 118 includes a winding 119 having a plurality of taps 120, with each of the taps including a tap switch 121 coupled to the primary AC voltage. The uninterruptible power supply 112 also includes signal amplitude monitoring means 122 coupled to the second input means 118 for monitoring the amplitude of the primary AC voltage, and tap control means 126 coupled to the signal amplitude monitoring means 122 and each of the tap switches 121 for selectively closing one of the plurality of tap switches 121 so the second input means voltage provided to the regulating transformer 110 is held to within a predetermined range, and for opening all of the plurality of tap switches 121 when the primary AC voltage falls outside of a predetermined allowable range to isolate the primary AC source. In the preferred embodiment, the winding taps 120 are selected so the second input means voltage provided to the transformer is adjustable by eight percent increments between 10 percent above the normal primary AC voltage and 20 percent below the normal primary AC voltage. Further, the first input means 114 provides up to three percent corrections to the load 18 within the four percent increments provided by the second input means 118.

An important difference between this device and the device illustrated in FIG. 1 is in the elimination of the magnetic shunts in the transformer. Elimination of these shunts substantially reduces the reactance present in the transformer 110. The transformer reactance is reduced to where the momentary change in the load voltage is less than 25 percent when the load and current changes from zero to its maximum value. In the preferred embodiment, the momentary change is on the order of about ten percent. This reduction in reactance substantially decreases the transformer size because of the lower mass and heat dissipation requirements. Further, the preferred embodiment achieves coarse regulation of the output load voltage by monitoring the primary AC voltage, and selecting an appropriate voltage tap in order to keep the input voltage within a predetermined range. By selection of the appropriate tap switch, the inverter needs to supply less make-up voltage for needed fine regulation of the load voltages. In the event that the AC power goes outside the maximum allowable limit which can be coarsely regulated by the selection of the appropriate tap switch 121, all four tap switches are opened, and the reserve power source supplies all of the power necessary for the load. The use of this system eliminates the need for increased reactance in the transformer for use with circulating current to make up the necessary supply voltage to work with the incoming AC power, and to prevent recirculating current back to the utility when the AC power goes outside the maximum allowable limit.

The transformer design 110 illustrated in FIG. 2 is one for essentially a single phase transformer. A three phase transformer design is essentially the same as shown in FIG. 2, only there is separate second input means 118 including separate tap switch sets 121 for each of the three input three phase AC power lines, and, likewise, there are three output coils 12, i.e., one for each of the three load phases. The inverter 14 also has three different phase input coils 13 to the transformer 110.

A voltage monitoring means 122 (FIG. 3) selects the appropriate tap switch 121. The voltage monitoring means illustrated is for a three phase uninterruptible power supply.

The voltage monitoring system 122 comprises a series of transformers 150, as shown in FIG. 3A, with one transformer 150 for each of the three incoming phase inputs. Each transformer 150 includes seven small coils 154 connected as shown (the coil end T2 of the first transformer is connected to the coil end T2 of the second transformer, for example) so that four of the coils 154 on each transformers 150 generate a voltage pulse about 15° out of phase with the next adjacent coil. The output of these coils, which thus produces four pulses per phase per cycle of input voltage, or a total of twelve pulses per cycle, is applied to the rectifier 160 illustrated in FIG. 3B. The rectified voltage produced from the various small coils 154 thus consists of 24 half pulses (as illustrated in FIG. 3D) per cycle of one of the phases (as illustrated in FIG. 3C) of input voltage or about 60 hertz for a conventional AC system. The provision of these numerous half pulses per 60 hertz of input voltage provides a quick change in the voltage output 164 from the rectifier 160 when the input AC voltage on any of the three phases changes. This quick voltage response causes the uninterruptible power supply 112 to operate quickly in response to primary AC input voltage changes. The output from the voltage rectifier 160 is applied to the input of the tap changer control 126 illustrated in FIG. 5, and described in greater detail hereinafter.

The tap switches 121 are changed only when there is zero current passing through the respective tap switch 121; i.e., at the point of zero crossing of the primary AC current wave through the switch 121. In order to monitor the current passing through each of the switches, a current monitor or sensor 170 is provided as illustrated in FIG. 4 for each of the three second input means 118 phases. The sensor for only one phase is shown. The current sensor shown provides a current monitoring system for each of the four tap switches 121, only one of which is shown in detail. A description of the circuit provided for the number "1" tap switch 121 likewise applies to the circuit provided for the other tap switches 121. Each tap switch 121, as illustrated in FIG. 4, comprises oppositely oriented parallel connected SCRs, a type of static line switch commonly known in the art. The voltage across each tap switch 121 is monitored in order to determine whether current is passing through the tap switch 121. If current is passing through the tap switch 121, then the voltage differential across the tap switch 121 will be small. If the tap switch 121 is open however, or if the current flowing through the switch is zero, a positive large voltage differential is found across the tap switch 121. This voltage is applied as an input to a comparator 174 which, when indicating that no current is passing through the tap switch 121, provides a signal to a NOR gate which in turn through an isolating light emitting diode turns on a transistor which in turn indicates to the tap changer control 126 that no current is passing through the tap switches 121.

Figure 5B:
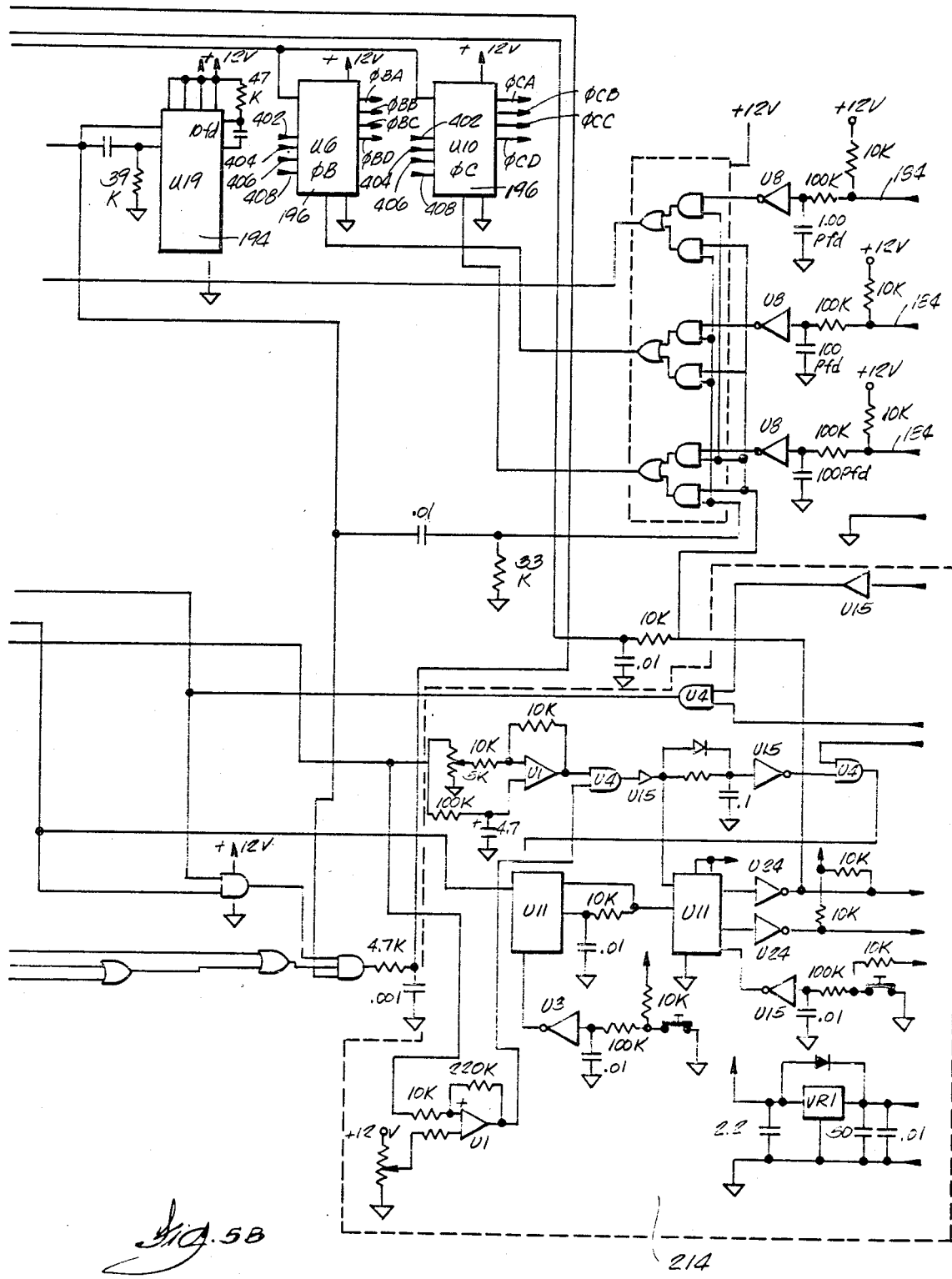
Figure 6:
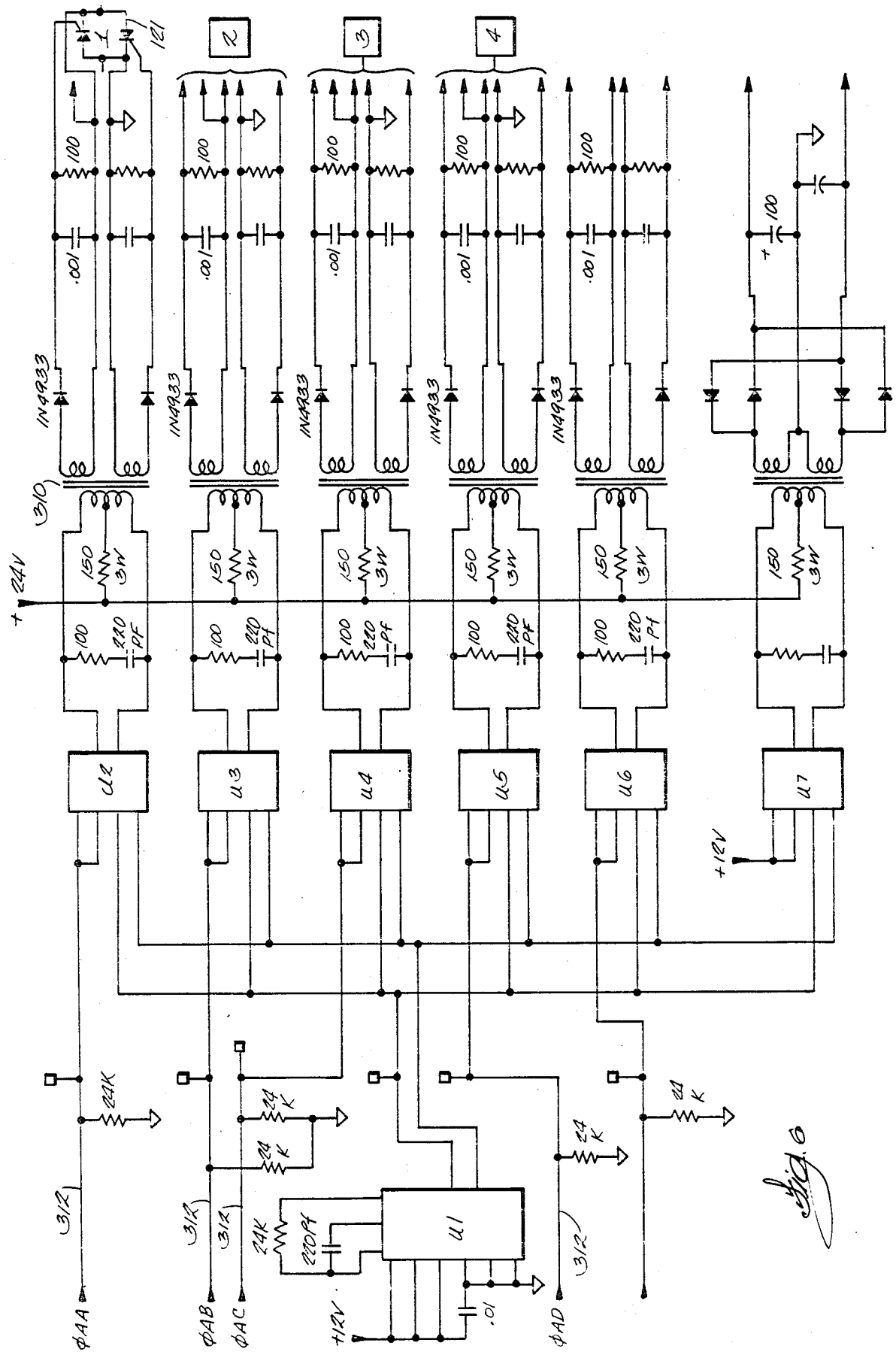
FIG. 6 is an illustration of the tap changer switch driver circuitry utilized in the uninterruptible power supply shown in FIG. 2.

Referring now to the tap changer control illustrated in FIG. 5, the control 126 has a voltage input 180 (FIG. 5A) connected to the voltage rectifier output 164, and three zero current inputs 184 (FIG. 5B) for each of the current sensors 170 illustrated in FIG. 4 for each primary input phase. As illustrated in FIG. 5, the rectified AC voltage is applied to an analog comparator 184 which determines the level of the incoming voltage and determines which one of the four tap switches should be closed. The output of the comparator 184 goes through a decoder 186 to a digital comparator 188 and decoder 190 which then feeds the encoder 192, the one shot timer 194, and the latches 196 which drive SCR drivers, one of which is illustrated in FIG. 6. The latches 196 thus only operate at zero current as indicated by the zero current inputs 184.

The latches 196 also have an input from an overcurrent protection circuit 200 (FIG. 5A). The overprotection circuit 200 inputs the load current from each of the three load phases at 202, 204 and 206 so that in the event of too much current passing to the load 18, the tap switches 121 can be opened in order to disconnect the AC power to the load 18. The load current sensors (not shown) are in the form of current transformers. Other current outputs 210 and system monitoring circuitry 214 are used for other purposes not relevant to this invention.

FIG. 6 illustrates the SCR driver circuitry for the tap switches on one of the three phases. The outputs 300 from the latches 196 operate through isolation transformers 36 to switch the respective tap switch 121. More particularly, an input signal terminal 312 is provided for each of the respective tap switches 121. The lowermost input signal terminal illustrated at the bottom of FIG. 6, which is connected to the logic gates U6 and U7, are used for other purposes not relevant to this invention. A description of the top SCR driver circuitry connected to the number "1" tap switch 121 is indicative of the operation of each of the respective SCR driver circuitry. The enabling signal coming from the tap changer control 126 and applied to the signal input 312 goes to the logic gate U2, for example. This gate is an AND gate with a high power output driver. The logic unit U1 is a monostable oscillator which generates a signal to the AND gate which then, together with the enabling signal, causes an alternating signal to be applied to the isolation transformer 310. The isolation transformer 310 then sends pulses to the respective tap SCRs to gate the SCRs in order to close the respective tap switch 121. In the event of the removal of the enabling signal, the tap switches are quickly biased open by the current from the reserve power supply 114 and no recirculating current thus flows to the utility.

The voltage monitoring and tap switch arrangement serves to provide coarse voltage regulation. Fine voltage regulation is provided by the inverter control system which operates in parallel arrangement with the primary AC power when at least one of the four tap switches is closed. In the event that all four static switches are opened, the DC reserve power source provides all of the power needs for the load.

In order to utilize a conventional inverter and control system which utilizes a limited range of output phase angles, in the preferred embodiment, the primary input winding taps and tap control are selected so that the magnitude of the input voltage is held to less than the desired output load voltage.

Other embodiments of the invention are within the scope of the following claims.

I claim:

1. An uninterrruptible power supply comprising:
   a regulating transformer,
   output means for connecting said transformer to a load,
   first input means for connecting a reserve source of AC power to said transformer, and
   second input means for connecting a primary source of AC power to said transfomer, said second input means comprising:
   a plurality of winding taps, each providing a different winding ratio between the primary source and the load,
   a plurality of tap switches, each coupling the primary source to said transformer through one of said winding taps, and
   voltage control means for monitoring the voltage of the primary source and, if the voltage is outside a predetermined maximum allowable range, opening all of said tap switches to isolate the primary source from said transformer, and, if said voltage is within said predetermined maximum allowable range, selectively closing one of said tap switches to coarsely compensate so that the voltage at the load is held within a predetermined range, and,
   wherein said first input means includes means for supplying power from the reserve source through said transformer to the load when said voltage control means has isolated the primary source, and means, operative when the primary source is coupled to the load through one of said taps, for augmenting the power supplied to the load from the primary source by providing an added voltage differential through said transformer to the load and finely regulating the load voltage so that the load voltage remains essentially constant.

2. A power supply according to claim 1 wherein said transformer has a reactance sufficiently small to keep the momentary change in said load voltage less than 25 percent when the load current changes from zero to full load.

3. A power supply according to claim 2 wherein said reactance of said transformer is sufficiently small to keep said change in load voltage to 10 percent or less.

4. A power supply according to claim 1 wherein there are three or more said winding taps.

5. An uninterruptible power supply comprising:
   a regulating first transformer,
   output means for connecting said transformer to a load,
   first input means for connecting a reserve source of AC power to said first transformer,
   second input means for connecting a primary source of AC power to said first transformer, said second input means including three three phase inputs, each of said three inputs including:
   a plurality of winding taps, each providing a different winding ratio between the primary source and the load,
   a plurality of tap switches, each coupling the primary source to said first transformer through one of said winding taps, and
   voltage control means for monitoring the voltage of the primary source and, if the voltage is outside a predetermined maximum allowable range, opening all of said tap switches to isolate the primary source from said first transformer, and, if said voltage is within said predetermined maximum allowable range, selectively closing one of said tap switches to coarsely compensate so that the voltage at the load is held within a predetermined range, said voltage control means including an amplitude monitoring second transformer including a primary winding connected to the primary source, at least six separate secondary windings connected together so that the output signals from said secondary windings are equally distributed over each cycle of each of said three phase inputs, and voltage rectifier means coupled to said secondary windings, and
   wherein said first input means includes means for supplying power from the reserve source through said transformer to the load when said voltage control means has isolated the primary source, and means, operative when the primary source is coupled to the load through one of said taps, for augmenting the power supplied to the load from the primary source by providing an added voltage differential through said transformer to said load and for finely regulating said load voltage so that said load voltage remains essentially constant.

6. An uninterruptible power supply comprising:
   a regulating first transformer including
   output means for connection to a load,
   first input means for connecting a reserve AC voltage source to said regulating first transformer,
   second input means for connecting a primary AC voltage source to said regulating first transformer, and
   signal amplitude monitoring means for monitoring the amplitude of the primary AC voltage source,
   said signal amplitude monitoring means comprises
   An amplitude monitoring second transformer including a primary winding coupled to the primary AC voltage source, at least two separate secondary windings connected together so that the output signals from said windings are equally distributed over each cycle of said primary AC voltage source, and voltage rectifier means connected to said secondary windings.

7. An uninterruptible power supply according to claim 6 wherein said signal amplitude monitoring means transformer includes at least six separate secondary windings so connected.

* * * * *